United States Patent
Kao et al.

(10) Patent No.: US 8,060,589 B1
(45) Date of Patent: Nov. 15, 2011

(54) SYSTEM AND METHOD FOR MONITORING EQUIPMENT OVER A NETWORK

(75) Inventors: Kim Y. Kao, Irvine, CA (US); Kent Kwan, Irvine, CA (US)

(73) Assignee: LogicLink Corporation, Newport Beach, CA (US)

( * ) Notice: Subject to any disclaimer, the term of this patent is extended or adjusted under 35 U.S.C. 154(b) by 1280 days.

(21) Appl. No.: 10/865,391

(22) Filed: Jun. 10, 2004

Related U.S. Application Data

(60) Provisional application No. 60/477,270, filed on Jun. 10, 2003.

(51) Int. Cl.
G06F 15/173 (2006.01)
G06F 15/16 (2006.01)

(52) U.S. Cl. ......... 709/223; 709/224; 709/208; 709/201

(58) Field of Classification Search ............... 709/223, 709/224, 208, 201; 713/300
See application file for complete search history.

(56) References Cited

U.S. PATENT DOCUMENTS

| | | | |
|---|---|---|---|
| 5,877,821 A * | 3/1999 | Newlin et al. ............. 348/724 |
| 6,393,478 B1 * | 5/2002 | Bahlmann ................ 709/224 |
| 6,711,613 B1 * | 3/2004 | Ewing et al. ............. 709/223 |
| 6,894,994 B1 * | 5/2005 | Grob et al. .............. 370/335 |
| 7,099,934 B1 * | 8/2006 | Ewing et al. ............. 709/223 |
| 7,171,461 B2 * | 1/2007 | Ewing et al. ............. 709/223 |
| 7,177,428 B2 * | 2/2007 | Gordon et al. ............ 380/251 |
| 2002/0107933 A1 * | 8/2002 | Choi ..................... 709/208 |
| 2002/0169914 A1 * | 11/2002 | Shteyn ................... 710/305 |
| 2002/0174444 A1 * | 11/2002 | Gatto et al. ............. 725/133 |
| 2004/0163118 A1 * | 8/2004 | Mottur .................. 725/105 |
| 2004/0203799 A1 * | 10/2004 | Siegel .................. 455/445 |
| 2005/0033707 A1 * | 2/2005 | Ehlers et al. ............ 705/412 |
| 2005/0044436 A1 * | 2/2005 | Holle ................... 713/320 |
| 2005/0132408 A1 * | 6/2005 | Dahley et al. ........... 725/80 |
| 2006/0031454 A1 * | 2/2006 | Ewing et al. ............. 709/223 |
| 2006/0248208 A1 * | 11/2006 | Walbeck et al. ........... 709/230 |
| 2007/0088823 A1 * | 4/2007 | Fowler et al. ............ 709/224 |

* cited by examiner

Primary Examiner — Karen Tang
(74) Attorney, Agent, or Firm — Blakely Sokoloff Taylor & Zafman LLP

(57) ABSTRACT

According to one embodiment of the invention, a network-based management system comprises a controller, a networked device and a control server. The control server is in communications with both the controller and the networked device having a communication port for such communications. The control server generates a user interface for display on the controller and used to activate and/or deactivate the networked device.

15 Claims, 17 Drawing Sheets

BUSINESS AUTOMATION CENTER @ hotel

Location Name:

- Crowne Plaza -
- Crowne Plaza -
- Crowne Plaza -
- Crowne Plaza -
- Crowne Plaza -
- Doubletree -
- Doubletree -
- Doubletree -
- Doubletree -
- Embassy Suites -
- Embassy Suites -
- Embassy Suites -
- Embassy Suites -
- Hampton Inn -
- Hampton Inn Suites -
- Hilton -
- Hilton -
- Hilton -
- Hilton -
- Hilton -
- Hilton -
- Hilton -
- Hilton -

_615_

| | |
|---|---|
| Location ID: | 574497401 |
| Name: | Embassy Suite - La Jolla (OWNED/90%) |
| Address: | 4550 La Jolla Village Drive<br>San Diego, CA92122 |
| Contact: | ONSITE RD(2/22/01) MF(8/24/00) soft (xxxx) PS(2/22/01) SHERRY FACER(Exec.) Doug Ramsey(GM) Phil Archer(Ch. Eng.) |
| Phone: | (858)453-0400 |
| Fax: | (858)453-1851 |
| Last Started: | Thursday, January 03, 2002 at 02:01:17 PM |
| Last Checkin: | Sunday, February 17, 2002 at 05:41:17 AM |
| Upgrade: | |
| BAV: | |
| DishSpace: | |
| OS: | |
| CPU: | 586 |
| Dialup1: | 226 = fax |
| Dialup2: | 227 = user |
| Dialup3: | 228 = cntrl/mdm/help |
| DateDiff: | 0 |
| TimeDiff: | -3 |
| Memo: | EXTRA TONER-XEROX COPIER & HP6 |

[TRANSACTIONS] [HOTEL EDIT] [BACK TO MAIN SCREEN]

*FIG. 10B*

SYSTEM AND METHOD FOR MONITORING EQUIPMENT OVER A NETWORK

This application is based on a U.S. Provisional Application 60/477,270 filed Jun. 10, 2003.

FIELD

Embodiments of the invention generally relate to a mechanism for selecting, monitoring, and controlling electrically powered devices over a network.

GENERAL BACKGROUND

With the expansion and public acceptance of the Internet, web cameras are being used more frequently. These cameras require a certain amount of bandwidth in order to route content over the Internet to a targeted viewer. Where multiple web cameras are deployed at a location, connections with much larger bandwidth capabilities (e.g., T-1 lines) are required in order to receive the content from these cameras. One existing challenge is to implement a system that can accommodate a large number of data streams from multiple cameras and concurrently control various remote devices and connections. Moreover, there is a need for a system that can control operational continuity of multiple networked devices.

BRIEF DESCRIPTION OF THE DRAWINGS

Features and advantages of embodiments of the invention will become apparent from the following detailed description in which:

FIGS. 10A-10C are exemplary embodiments of a back-end management system that enables location owners to review credit card transactions and revenue calculations.

DETAILED DESCRIPTION

Figure 1:
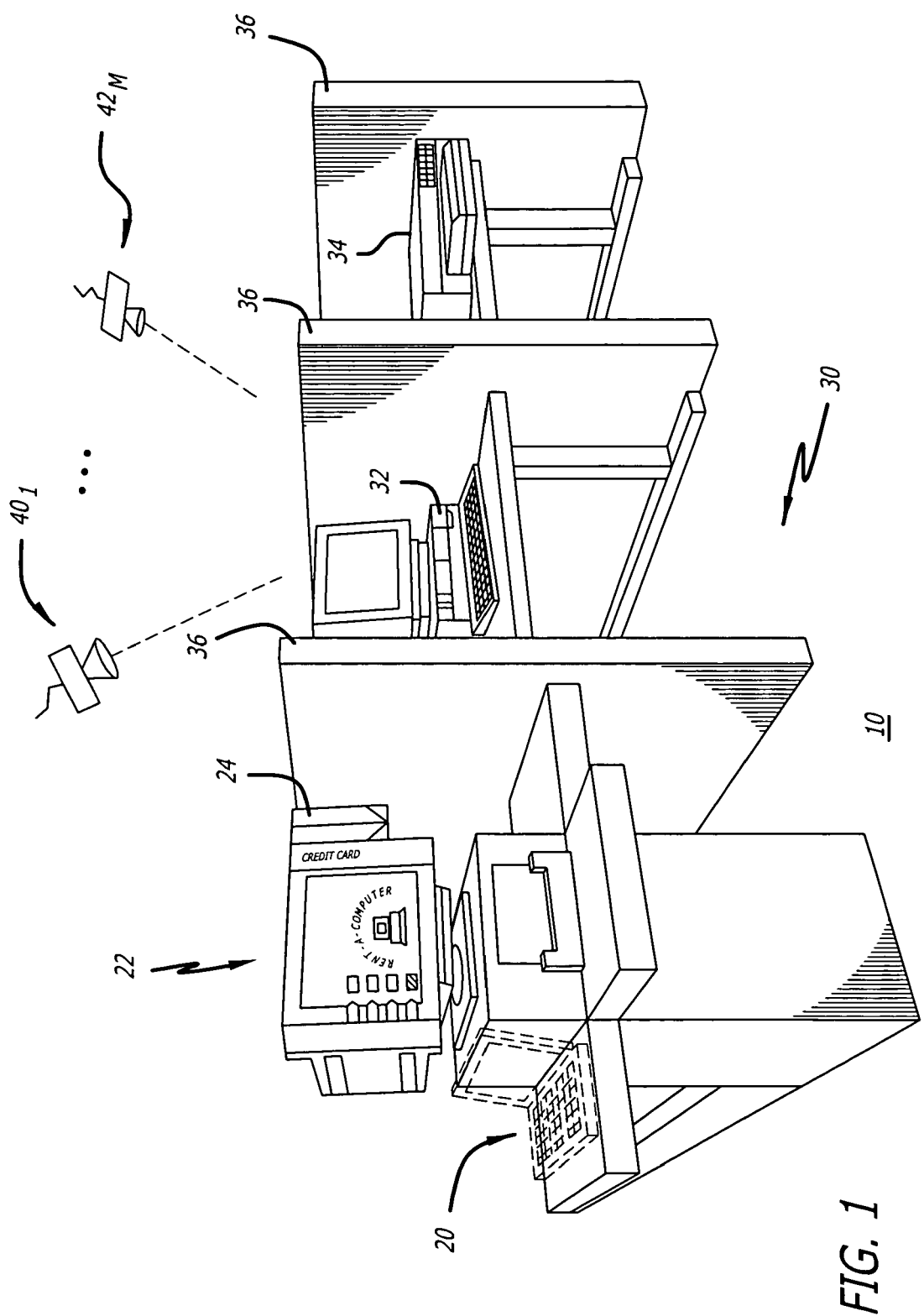
FIG. 1 illustrates a first exemplary embodiment of a system for interactively selecting, activating and monitoring electrically powered devices including computers and computer peripheral devices.

Embodiments of the invention set forth in the following detailed description generally relate to a network addressed switching mechanism that controls power and continuity over the control links, namely the on/off enabling of data and other types of information streams, supplied to electrically powered devices. More specifically, according to one embodiment of the invention, the switching mechanism is Internet-Protocol (IP) based and not only enables data from any networked device to be routed over a public network for display, but also enables activation and/or deactivation of the networked devices as well as continuity of connections over the public network.

As an illustrative example, the switching mechanism may be deployed to activate and/or deactivate network jack connections within hotel meeting and guest rooms based on information transmitted from an externally located web server. According to another embodiment of the invention, the switching mechanism may be deployed to activate and/or deactivate multiple web cameras as well as relays controlling continuity of data and power lines for the networked devices.

In the following description, certain terminology is used to describe various features of one or more embodiments of the invention. As an example, a "link" is generally defined as communication pathway, normally formed by a medium that is capable of transferring information from one location to another. Examples of a link include, but are not limited or restricted to one or more electrical wires, cable, optical fiber, bus traces, or air when the networked device (defined below) is deployed with a wireless transmitter and/or receiver.

A "networked devices" is an electrically powered device that is capable of being controlled and/or monitored over a network. As an example, a networked device may be coupled to a network via a communication port. The "communication port" includes, but is not limited or restricted to a jack or any other type of connector including a parallel port, Universal Serial Bus (USB) port and the like. Examples of networked devices being controlled include, but are not limited or restricted to various types of office equipment (e.g., computer, printer, facsimile machine, docking station, plotter, projector, copier, or the like), routers, IP print servers, door locks, modems and the like. Examples of network devices being monitored include, but are not limited or restricted to IP-based cameras, temperature sensing devices (thermocouples), sound activated devices, motion activated devices and infrared (IR) activated devices and the like.

"Software" is generally defined as one or more instructions that, when executed, cause the switching mechanism to perform a specific function or operation. Stored in machine-readable medium, these instructions may be a series of instructions or may take the form of an application program, a routine, an applet, or the like. Examples of machine-readable medium, which is any medium that can store and transfer information, include a link, an electronic circuit, a semiconductor memory device (non-volatile or volatile), a data storage disk (e.g., mechanical or optical hard drive), or any portable storage media such as a diskette, a disc, tape, card, memory stick and the like.

Referring now to FIG. 1, an exemplary embodiment of portion of a system 10 configured to interactively monitor and control one or more electrically powered devices is shown. For one embodiment of the invention, system 10 comprises a user interface unit 20 and a business center 30. Business center 30 comprises one or more computers 32 along with at least one computer peripheral networked device 34. While the networked devices of this embodiment involve office equipment deployed within business center 30, it is contemplated that system 10 may be utilized for networked devices other than office equipment such as web cameras, appliances such as, for example, a television, coffee maker, air conditioning system or the like.

Herein, system 10 provides its users with multiple ways for controlling particular groups of networked devices. For instance, user interface unit 20 may be adapted as an interface for users to control activation and/or deactivation of power supplied to the networked device. An illustrative embodiment of user interface unit 20 comprises a touch screen or a video monitor with data input via a keyboard or keypad (generally referred to as a "display" 22). More specifically, display 22 communicates with a controller and/or a switching mechanism (described below), which controls activation and/or deactivation of one or more networked device.

Herein, according to one embodiment of the invention, display 22 presents a sequence of menus that interactively prompt a user to designate one or more (or a selected group of) networked devices. These devices may be inclusive of computer(s) 32 and/or peripheral networked device(s) 34.

Herein, the controller (not shown) executes software for providing user interface control signals to display 22. The switching mechanism (not shown) also receives switching control signals generated by execution of software by the controller. For one embodiment, these control signals may be transmitted over a communication port (e.g., parallel port, USB port, etc.). As discussed below in greater detail, system 10 may include additional software for providing communications interfaces to other computers, intelligent peripherals (e.g., payment receiving mechanisms), or telecommunications hardware (e.g., telephones, facsimile machines).

Operating in combination with display 22 of FIG. 1 is a mechanism for receiving payment, such as, for example, a card reader 24 for obtaining information from a credit card, a debit card or pre-paid debit card, smart card, membership card, room key, or any other type of card. Alternatively, the mechanism for receiving payment can take another form such as a coin and/or currency receiving mechanism, a biometric recognition system linked to a database of personal or business accounts to verify characteristics of the user (e.g., fingerprint, retinal scan, voice recognition, etc.).

Figure 2:
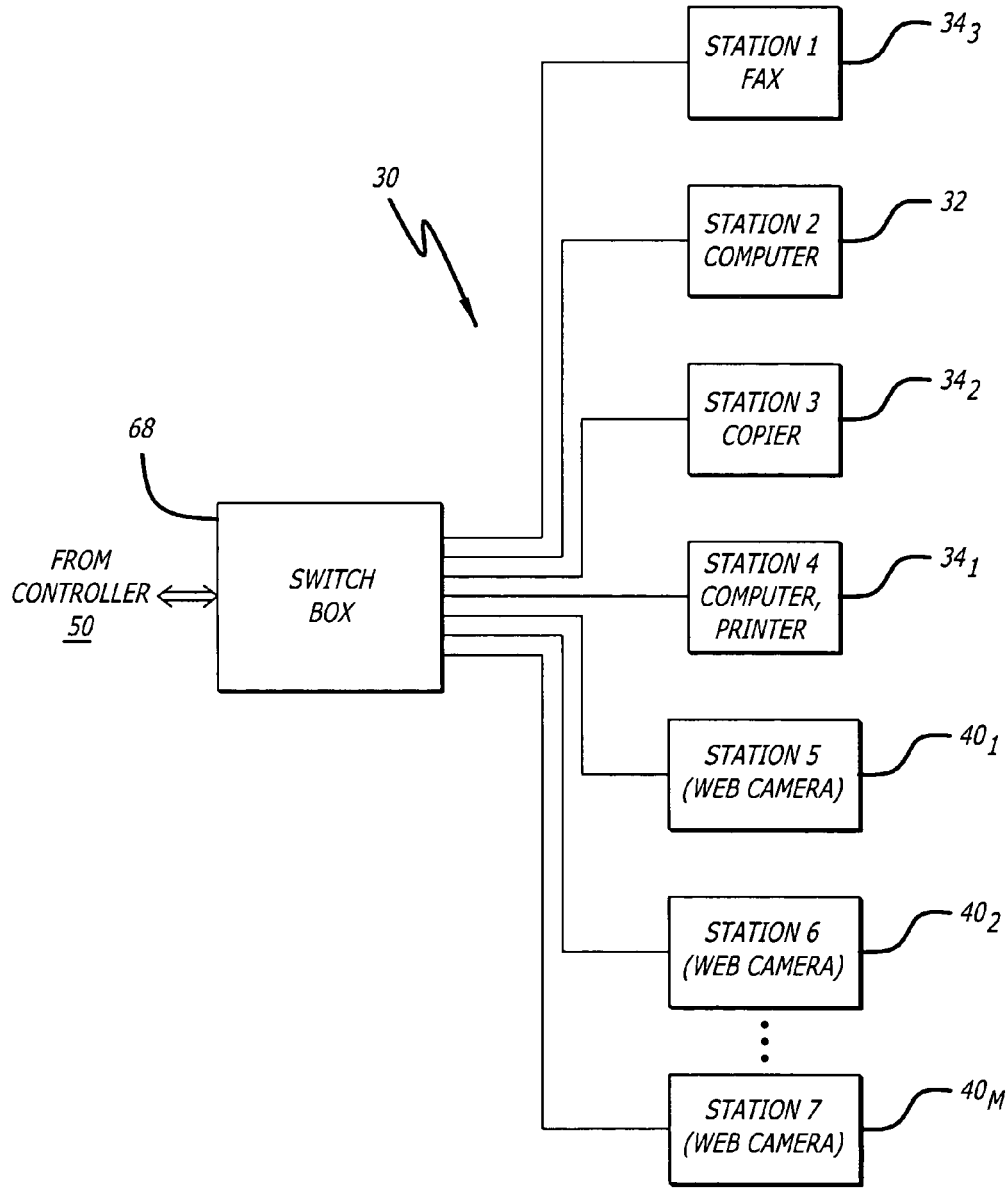
FIG. 2 illustrates an exemplary embodiment of the functional relationship between a central controller and a plurality of networked devices adapted to be powered on or off.

As shown in FIG. 1, the networked devices may be positioned in distinct areas separated by partitions 36 or may be arranged in any manner which anticipates typically selected combinations of office equipment. Web cameras $40_1$-$40_N$ ($N \geq 1$), serving as a networked device are positioned at different locations to view business center 30 or its surrounding areas. These web cameras $40_1$-$40_N$ are also in communication with the switching mechanism (e.g. a switch box 60) as shown in FIG. 2. This allows for closed loop feedback on performance, activity and status of the controlled equipment.

Referring now to FIG. 2, switch box 60 is in communication with a plurality of networked devices 32, $34_1$-$34_3$ and $40_1$-$40_3$ (also referred to as "stations"), which provides redundant computer and computer peripheral devices so that more than one user can simultaneously create, activate and use "custom offices". Switch box 60 is coupled to each station 32, $34_1$-$34_3$ and $40_1$-$40_3$ and is adapted to activate and deactivate these stations 32, $34_1$-$34_3$ and $40_1$-$40_3$. For instance, switch box 60 provides power to and establishes data communications with station $34_3$ (e.g., facsimile machine) via a link as shown.

Switch box 60 is further adapted to activate and/or deactivate a station $34_2$ (e.g., copier). Switch box 60 can, for example, provide power to and establish data communications with a station $34_1$ such as an electrically interconnected computer and/or printer, which have been configured to be used together. Stations $40_1$-$40_3$ may comprise other computers or computer peripheral devices such as a docketing station for a laptop computer to enable the laptop to operate with computer peripherals or may be adapted as different web cameras as shown.

In this embodiment, controller 50 may be in communication with switch box 60 and is responsible for determining whether or not payment has been made by a prospective user of system 10 and to perform equipment status and equipment monitoring verifications. This is accomplished by comparing the real time monitored data from the networked monitoring devices with established data representing equipment status stored in the controller 50. For example, controller 50 receives inputs from a credit card reader 24 of FIG. 1. Based on the data received from networked (monitoring) devices, the controller 50 shall perform a logic check using the IP camera data showing the status light of a networked device and comparing the intensity of the status light with know intensity levels stored in the equipment status database. The controller 50, upon verification using a predetermined verification algorithm, will then output the proper control signals. Also, although not shown, a printer may also be electrically connected to controller 50. The printer may be designated as a dedicated printer which, for example, receives control signals from controller 50 and is only used to print receipts to acknowledge payment or prepayment by the user.

Figure 3:
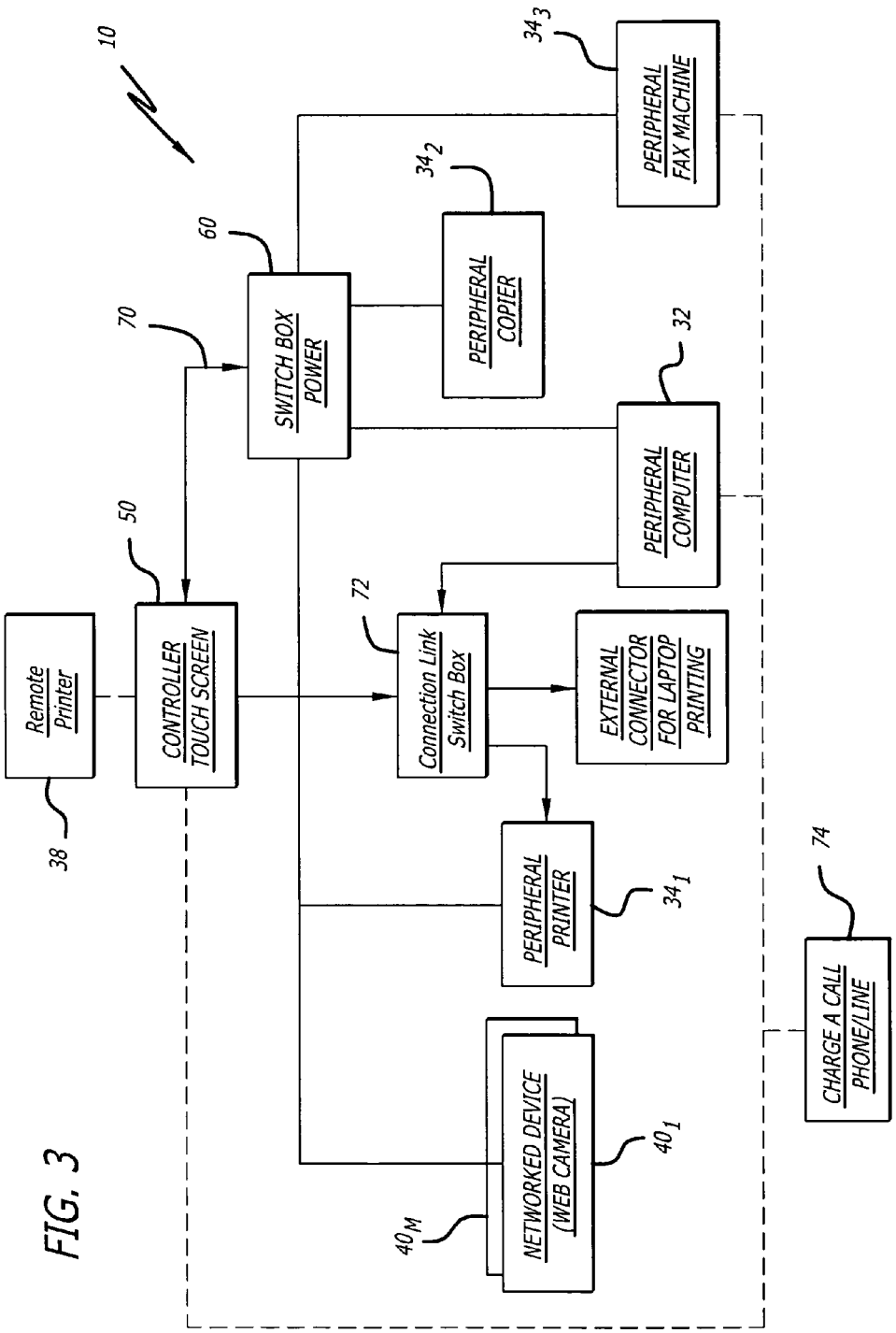
FIG. 3 is an exemplary block diagram illustrating logical connections within the system of FIG. 1 for interactively selecting, activating and monitoring electrically powered devices.

Referring now to FIG. 3, an exemplary block diagram illustrating logical connections within the system of FIG. 1 for interactively selecting, activating and monitoring networked devices is shown. In this embodiment, controller 50 provides user interface control signals to a touch screen display. System 10 comprises a switch box 60, which receives switching control signals from controller 50 along a link 70. It is contemplated that the signal path between controller 50 and switch box 60 may be over a wired or wireless communication path.

As further shown in FIG. 3, system 10 also comprises a connection link switch box 62 which, for example, selectively establishes communications between one of the communication ports of (i) controller 50 and peripheral computer station 32 and (ii) peripheral printer station $34_1$. The operational aspects of the switch boxes 60, 62 are discussed below in greater detail. It should also be appreciated that the two switch boxes 60, 62 can be configured within a single switch box. As discussed above, controller 50 can also be adapted to support various telephonic data communication interfaces such as a charge-a-call phone line interface 74, a coinless pay phone equivalent.

As an optional feature, system 10 may include a printer 38 located at a secure, remote location such as a front desk of a hotel. In this way, a user may use a room key having a magnetic strip to pay for usage of system 10, in which case the receipt will be printed at the front desk. The hotel personnel can then add the cost of usage of system 10 to the user's room bill. Alternatively, remote printer 38 may be located at a centralized location for billing members who use member cards. These connections made accomplished via wired or wireless methods.

Figure 4A:
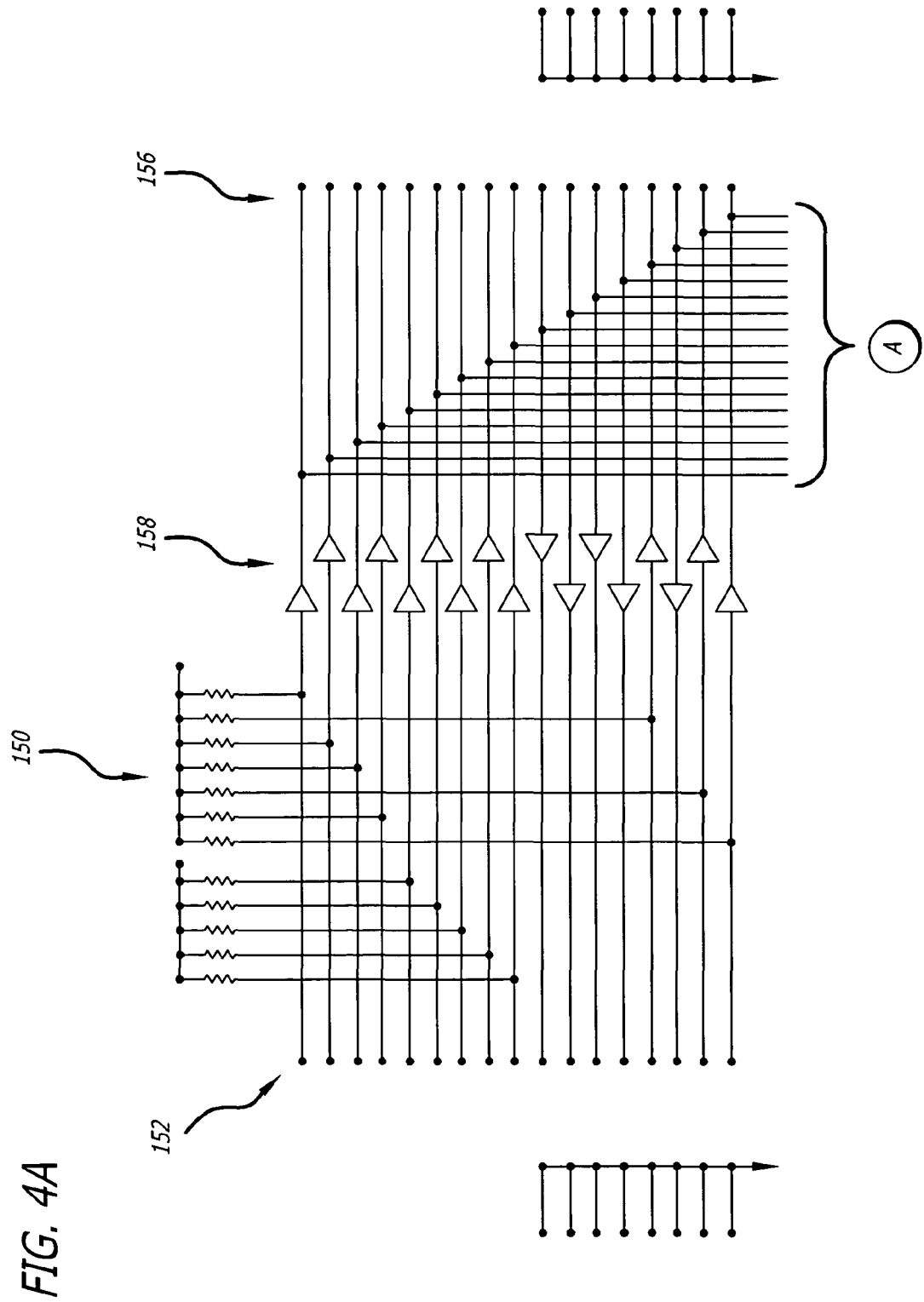
FIGS. 4A and 4B illustrates an exemplary embodiment of an electrical schematic of communication link circuitry of one interactive electrical device selecting and activating the system of FIGS. 1 and 3.
Figure 4B:
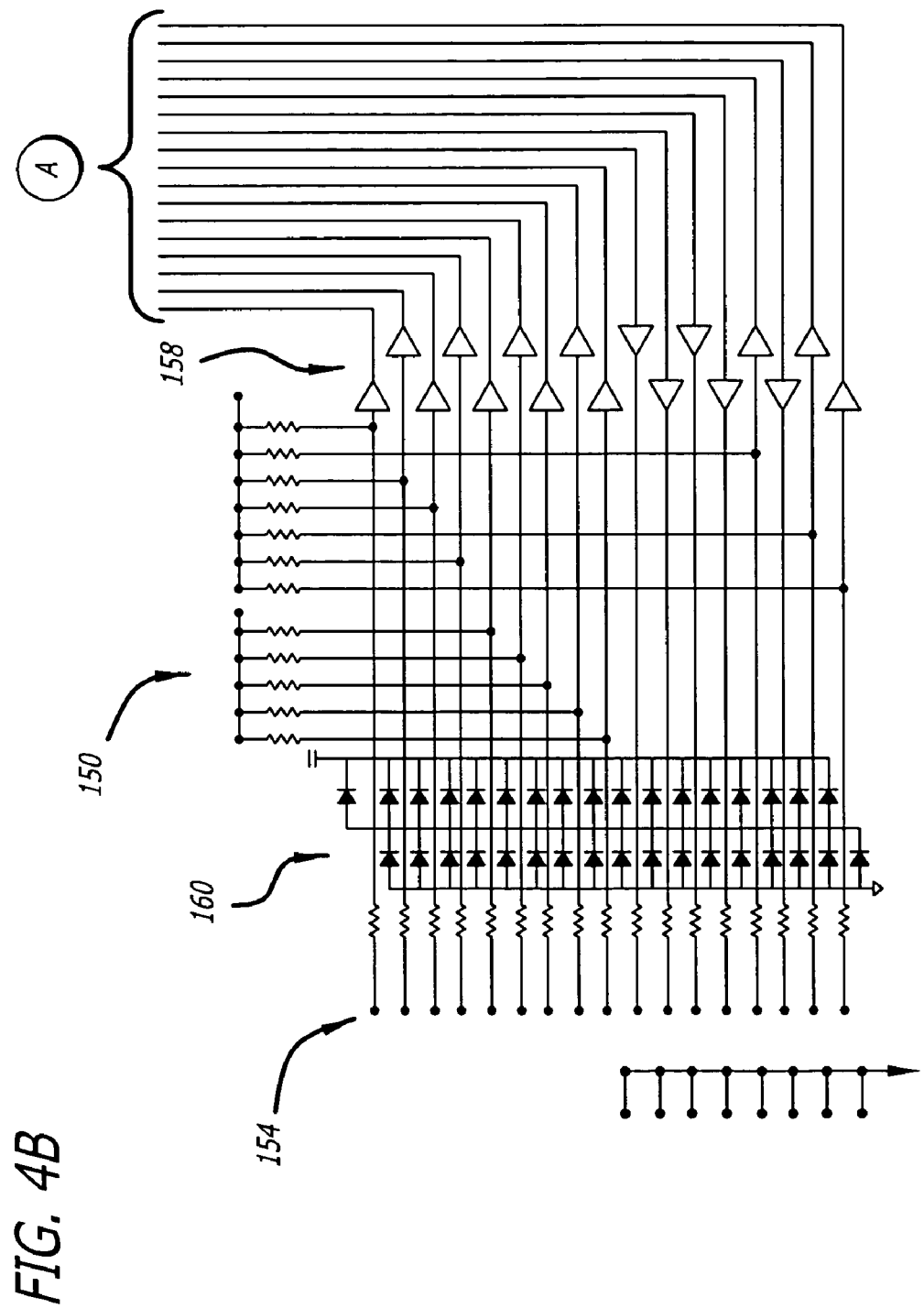

FIGS. 4A and 4B show an electrical schematic of communication link circuitry 150 of system 10. Communication link circuitry 150 may be, but is not necessarily, located within switch box 62 of FIG. 3. Generally, communication link circuitry 150 acts as a switch determining which of several communications ports is electrically connected to a peripheral device such as a printer.

Referring to FIGS. 3, 4A and 4B, controller 50 and peripheral computer station 32 both include at least one communication port such as a parallel and/or USB port. The peripheral printer station $34_1$ is connected to one of the aforementioned communication ports via communication link circuitry 150.

As an illustrative example, parallel port connections 152 (FIG. 4A) and parallel port connections 154 (FIG. 4B) are respectively connected to two different networked devices such as controller 50 and peripheral computer station 32 via currently favored connection hardware, e.g., conventional 25-pin D-connectors. Parallel port connections 156 (FIG. 4A) are connected, for example, to the peripheral printer station $34_1$ (FIG. 3).

Referring again to FIGS. 4A and 4B, unidirectional buffer circuitry 158 may be replaced with bi-directional relay circuitry to facilitate bi-directional communications. Moreover, protection circuitry 160 (e.g., diodes, etc.) may also be included.

Figure 5:
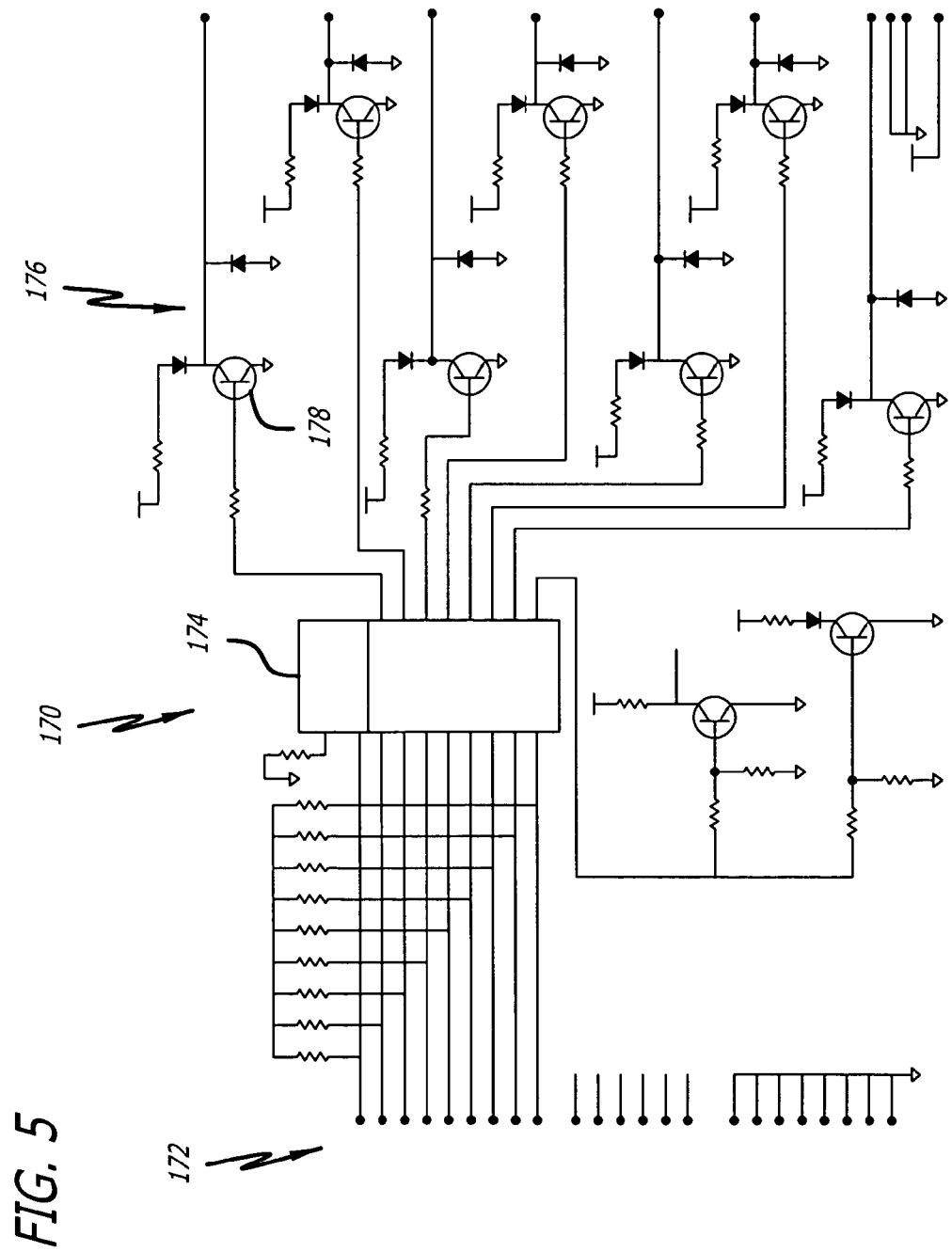
FIG. 5 illustrates an exemplary electrical schematic of the switching control circuitry of one interactive electrical device selecting and activating the system of FIG. 1.

FIG. 5 shows an electrical schematic of switching control circuitry 170 when employed within system 10. Connections 172 are electrically connected to a control port of controller 50. In one embodiment, m-bits (e.g., $m \geq 8$) of data are provided to the connections 172 at a communication port of controller 50, which has been adapted to function as a control port. The 8-bits of data are provided to a data latch integrated circuit 174 which, for example, comprises a standard 74LS373 integrated circuit chip. The outputs of data latch integrated circuit 174 are provided to analog transistor circuitry 176, which provides inputs to relays (not shown) for controlling the activation and deactivation of the stations. The individual transistors 178 comprise, for example, a conventional 2N2222 transistor. As shown in FIG. 5, light-emitting diodes (LEDs) may be provided if desired.

Figures 6, 7C:
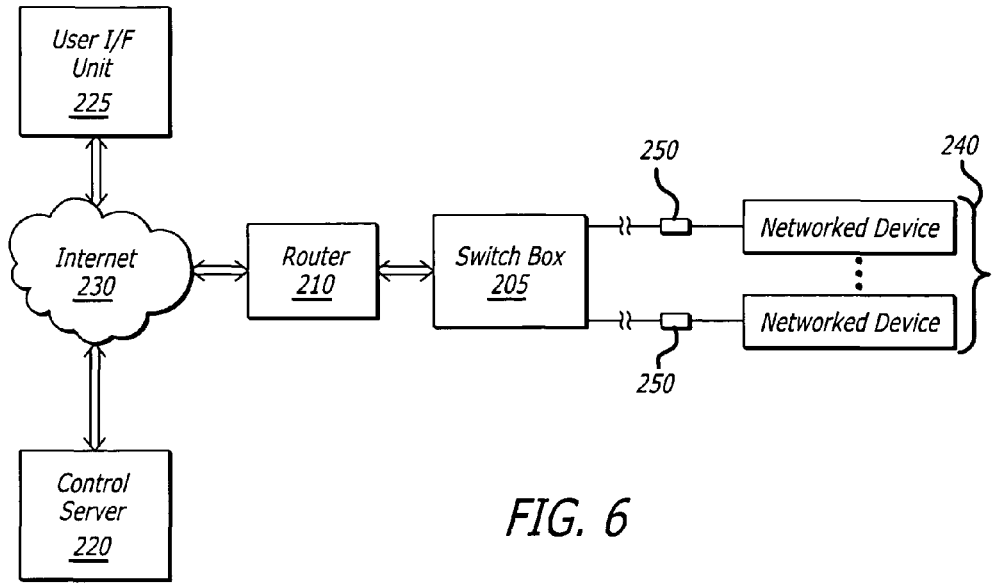
FIG. 6 illustrates an exemplary embodiment of the system adapted for monitoring a location using multiple web cameras controlled by the switch box.
FIGS. 7A-7C illustrate a first exemplary embodiment of three display screen interfaces used to control the selection, activation and deactivation of networked devices as well as the maintenance of continuity of power or data to networked devices.

FIG. 6 is an exemplary embodiment of system 10 adapted for monitoring a location using networked devices deployed within a network 200 (e.g., LAN) is shown. System 10 comprises a switch box 205 (generally equivalent to switch box 60 of FIG. 2), a router 210 with an IP-based communication port, a control server 220, one or more user interface units 225, and a plurality of networked devices 240 coupled to switch box 205. Any combination of these components can be used within network 200 to allow automation from control server 220, which may be positioned external to network 200 or internally within network 200.

According to this embodiment of the invention, user interface unit 225 may be a computer that enables users access to control server 220 in order to select which networked devices 240 to control. Alternatively, user interface unit 225 may be any of the following: kiosk, personal digital assistant, cellular telephone, or any other device having network connectivity. The plurality of networked devices 240 may include multiple web cameras $40_1$-$40_N$ controlled by switching control circuitry as shown. These cameras may also serve as networked monitoring devices thereby providing data to the web-based control server 220 allowing the determination of networked device status.

Part of the switching control circuitry comprises switch box 205, which is located in the business center if only the networked devices of the business center are being controlled. However, if switch box 205 is configured to control network jacks throughout the hotel, it would be better to locate switch box 205 in the network equipment room where all telephone wires and communication links are feed into.

Herein, switch box 205 is in communication with router 210 (e.g., DSL router). For this embodiment, switch box 205 is coupled to a communication port (e.g., parallel or USB port) of router 210. This coupling enables a fixed IP-address associated with router 210 to be utilized by switch box 205. Moreover, in accordance with this system architecture, control server 220 can be adapted to and support communications with multiple networks, namely multiple switch boxes 205 over a public network 230 (e.g., the Internet). Control server 220 may be configured to host a web page and process software to remotely control the networked devices 240.

According to one embodiment of the invention, switch box 205 is coupled to networked (monitoring) devices 240 being one or more web cameras (e.g., web cameras $40_1$-$40_N$ of FIG. 1). These web cameras 240 may be IP-based and each provide content feeds (e.g., an image or series of images, audio, or video) into corresponding jacks 250. The corresponding jacks 250 are adapted to switch box 205 and enable one of the content feeds to be routed over the public network (Internet) 230.

Figure 7A:
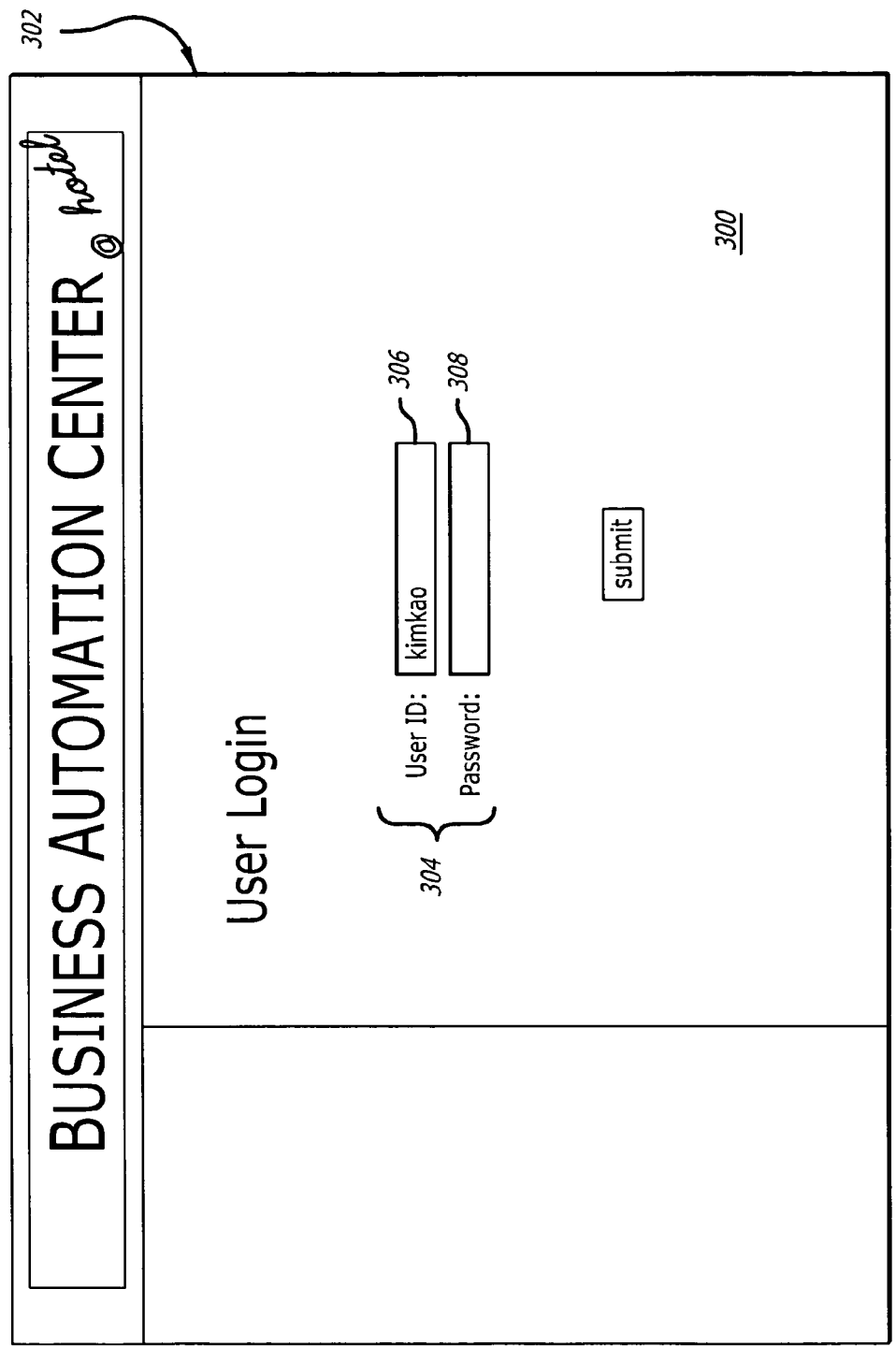
Figure 7B:
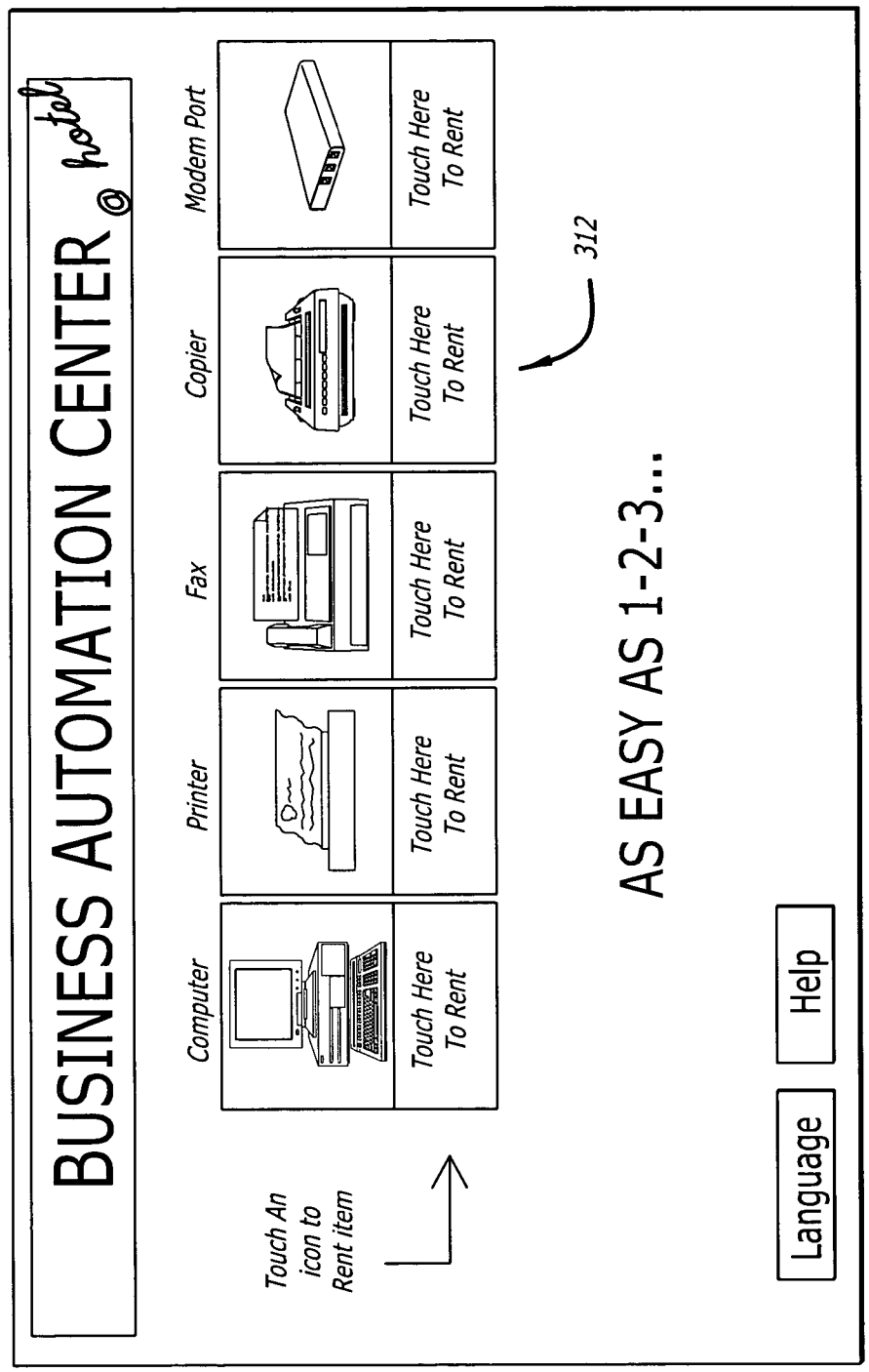

For this system, as shown in FIGS. 7A-7C, a first exemplary embodiment of three display screen interfaces 300, 310 and 320, which are used to control the selection, activation and deactivation of networked devices as well as the maintenance of continuity of power or data to networked devices, is shown. These screen interfaces are produced by software loaded on control server 220 to control the selection of web cameras as well as the activation and deactivation of these web cameras. The deployment of web cameras is solely selected for illustration purposes.

As shown in FIG. 7A, a first interface 300 is represented as a web page 302 hosted by control server 220. Web page 302 features User Login entry fields 304 to receive a User ID 306 and password 308 as input. It is contemplated that the specific alphanumeric characters associated with at least password 308, and perhaps User ID 306, are not shown for security purposes. This input information is recognized by control server 220 before allowing the user to (1) view or listen to feed from web cameras or (2) remotely activate or deactivate these web cameras.

As further shown in FIG. 7B, a second interface 310 is displayed on a touch screen as set forth in FIGS. 1 and 3. Upon selection of one or more icons 312 corresponding to different types networked devices to be used, further interfaces will be produced to enable the user to select his or her payment option. For instance, a virtual keyboard or keypad may be displayed to enable the user to enter his credit card number, debit card number, pre-paid card number, bank routing number, etc.

As further shown in FIG. 7C, a third interface 320 is a graphics user interface (GUI) of property management software loaded at user interface unit 225 (e.g., computer at the front desk or concierge). This interface 320 enables communications to be established with control server 220 of FIG. 6 to schedule activation/deactivation of selected web cameras 322 and 324 as well as activation/deactivation of other networked devices. Thus, arrangements for activation or deactivation of selected groups of networked devices can be made in advance.

It is contemplated that the data from networked (monitoring) devices and the content feeds from web cameras 240 of FIG. 6 may be digitally recorded to expand security at these locations, determine equipment status and subsequently identify users of the equipment.

Figure 8:
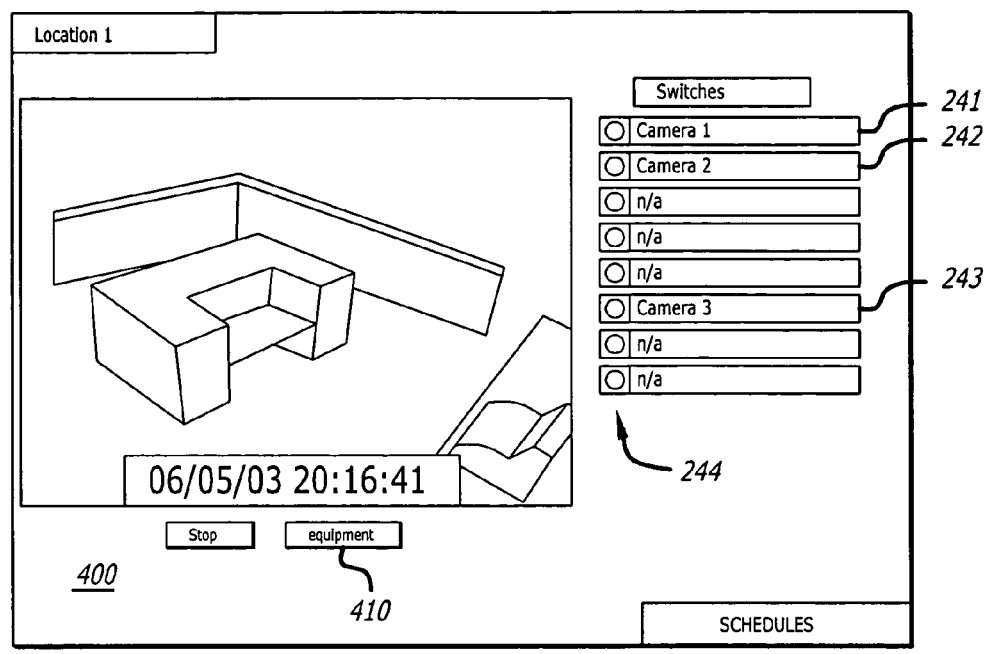
FIG. 8 illustrates an exemplary embodiment of a web page that enables a user to selective activate different web cameras is shown.

Referring now to FIG. 8, a web page 400 for selectively activating different web cameras is shown. At least 8 and perhaps up to 256 (or more) cameras may be monitored using a single 56K webcam broadcast server. Upon creation of web page 400, a portion of web page 400 lists those web cameras that are available. Herein, for this illustrative embodiment, three web cameras 240 are listed and controlled in real-time: camera1 241, camera2 242 and camera3 243. Upon selection of a corresponding marker 244 next to the particular camera, the remotely located switch box selects the appropriate camera to provide a feed.

Figure 9:
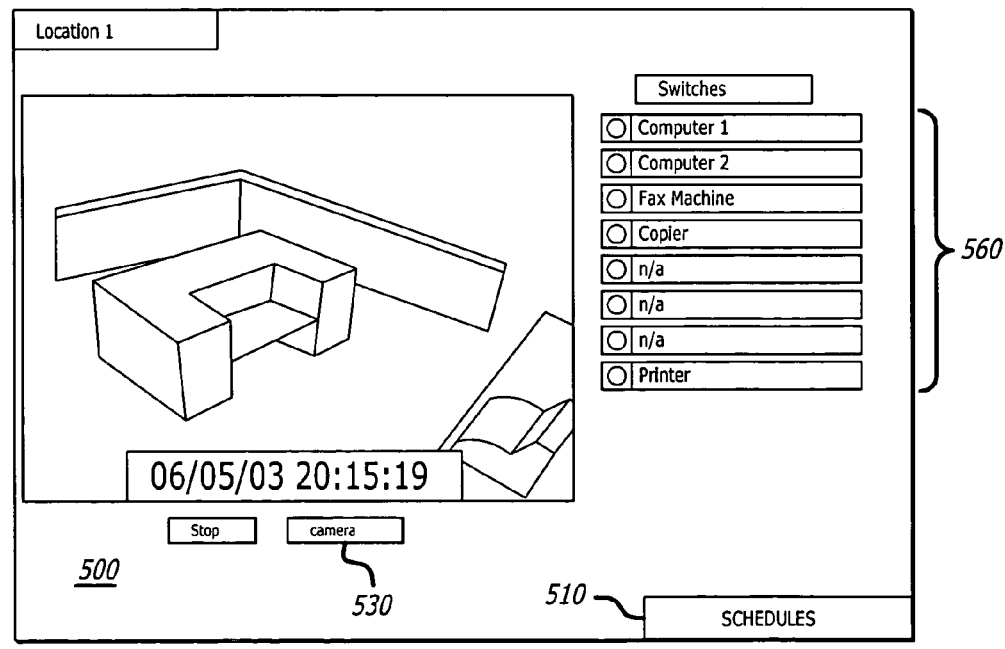
FIG. 9 illustrates an exemplary embodiment of a web page that enables a user to selective activate different electrical devices over a public network.

Upon depressing the "equipment" button 410, as shown in FIG. 9, a second web page 500 is generated, which lists the networked devices 510 being controlled by switch box 205 or perhaps another switch box in series with switch box 205. The "Schedule" button 520 enables the viewer to schedule activation/deactivation of any of these networked devices in advance. Depressing the camera button 530 returns the viewer back to camera web page 400 of FIG. 8.

Figure 10A:
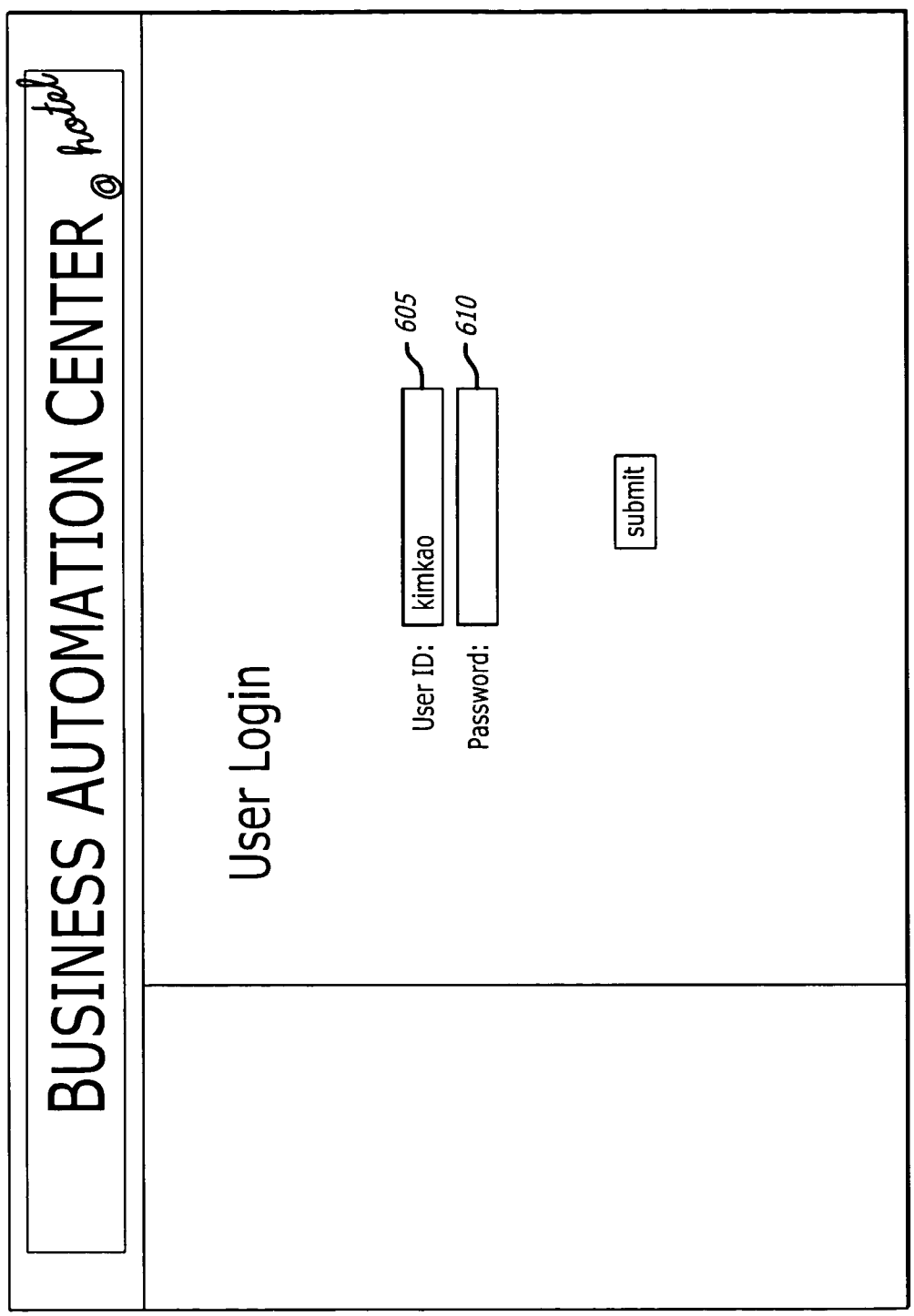
Figure 10C:
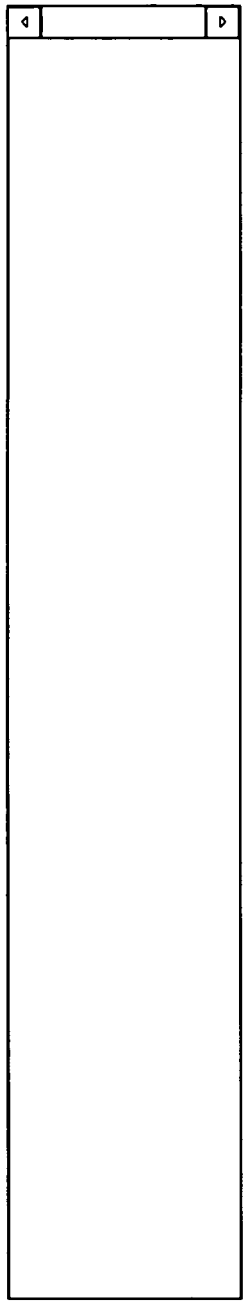

Referring now to FIGS. 10A-10C, exemplary embodiments of a back-end management system 600 that enable location owners to review credit card transactions and revenue calculations is shown. Upon entering an authorized user identifier 605 and password 610, the user is granted access to a list 615 of locations accessible to the user and is able to obtain a list of transactions associated with those locations 620.

Referring to FIGS. 11A-11D, a second exemplary embodiment of display screen interfaces used to control the selection, activation and deactivation of networked devices as well as the maintenance of continuity of power or data to networked devices is shown. According to one embodiment of the invention, these interfaces are produced by software coded for management of the networked devices and loaded within control server 220. Alternatively, some or all of display screen interfaces of FIGS. 11A-11D may be produced by router 210 having programmability and/or user interface unit 225.

Figure 11A:
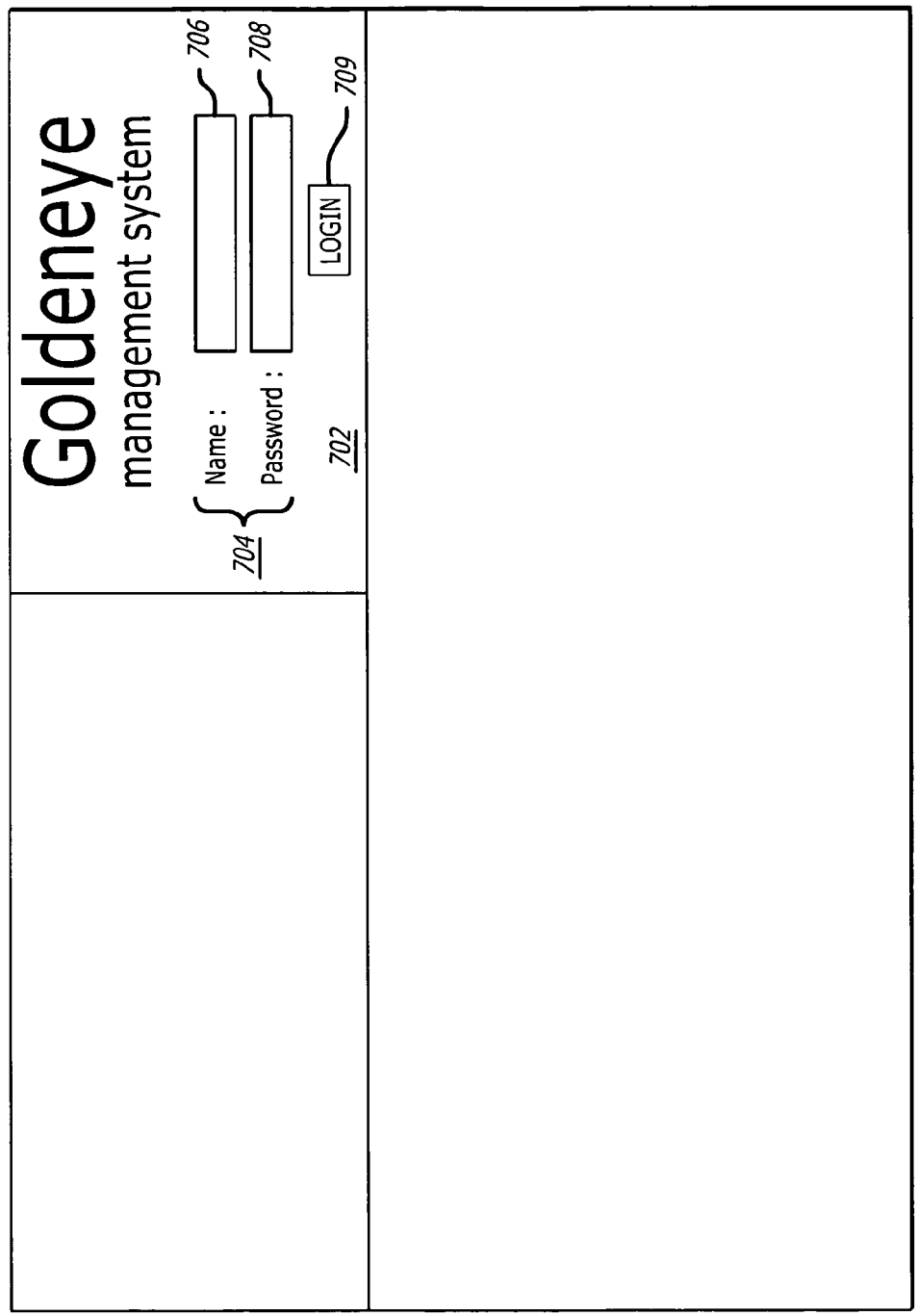
FIGS. 11A-11D illustrate a second exemplary embodiment of display screen interfaces used to control the selection, activation and deactivation of networked devices as well as the maintenance of continuity of power or data to networked devices.

As shown in FIG. 11A, a first screen interface 700 features a user verification display section 702. This display section 702 may be generated locally or hosted as a web page by a remotely located source such as control server 220 of FIG. 2 for example. Display section 702 features a plurality of fields 704 to receive requisite information to identify and verify the user requesting activation and/deactivation of networked devices. For instance, according to this embodiment, entry fields 706 and 708 are configured to receive an identifier of the user (e.g., user ID, legal name of user, etc.) and a password provided to the user, respectively. After entering the requisite information, a login button 709 is depressed to verify the user through password confirmation, and upon verification of the user, the software for management of the networked devices is launched.

Figure 11B:
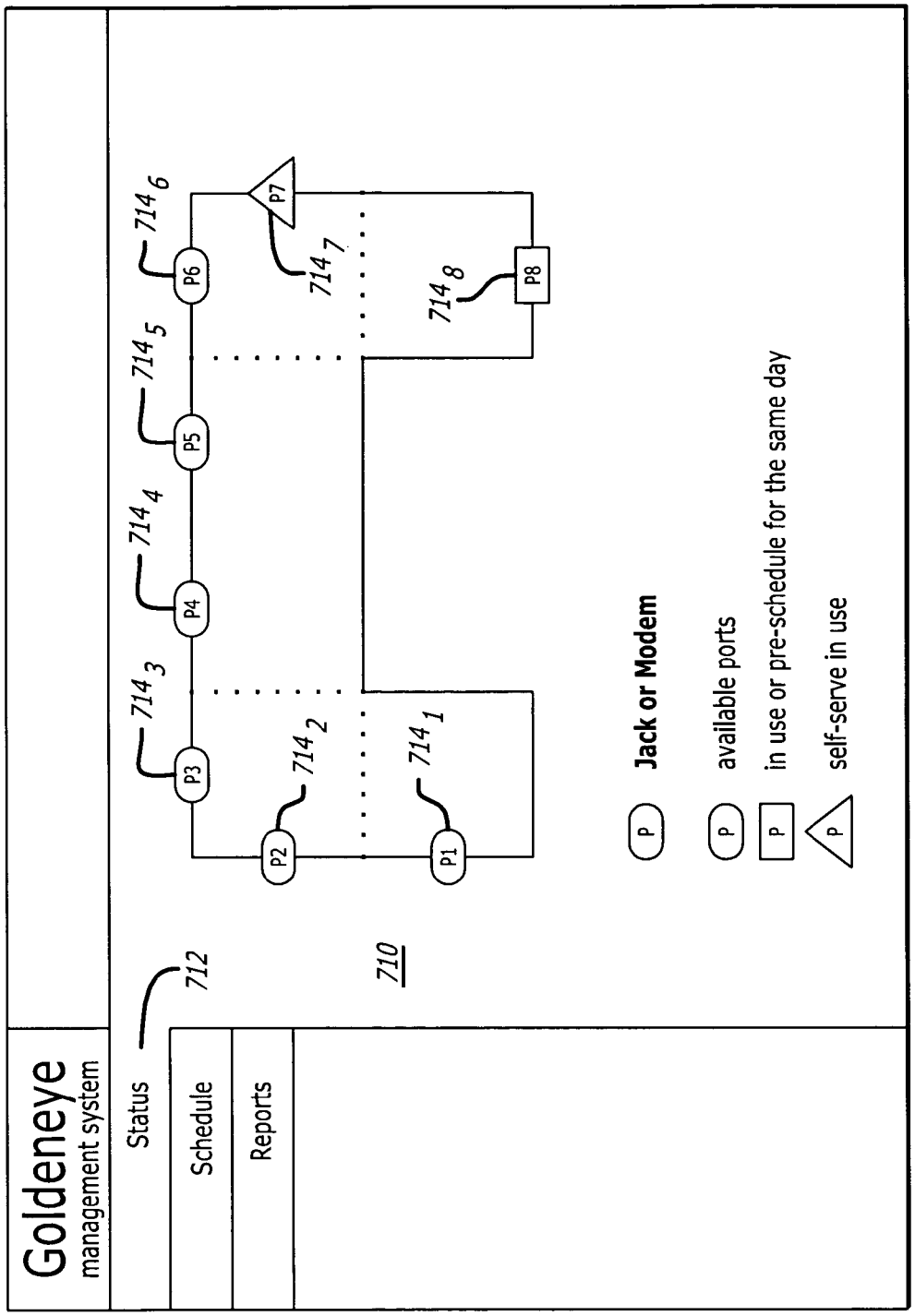

As shown in FIG. 11B, after user verification, a second display screen interface 710 is generated in response to selection of a "STATUS" selection button 712. Second display screen interface 710 illustrates a logical layout of "M" ($M \geq 1$) communication ports $714_1$-$714_m$ available within the system. Examples of these communication ports include, but are not limited or restricted to jacks, USB ports, parallel ports, serial ports, and the like. This logical layout enables the user to determine which communications ports $714_1$-$714_M$ to reserve for use as shown in FIG. 11C.

Figure 11C:
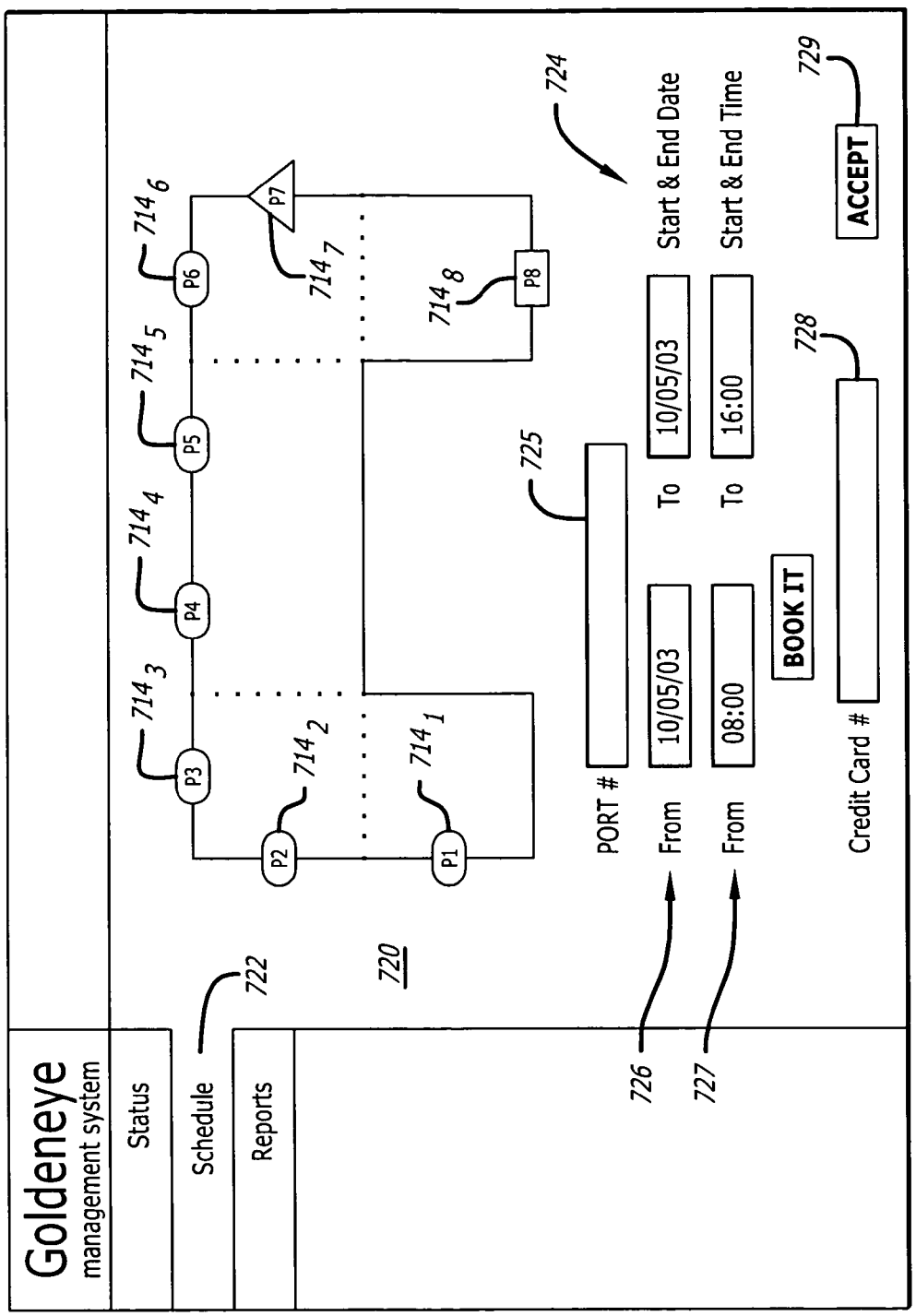

As shown in FIG. 11C, a third display screen interface 720 is generated in response to selection of a "SCHEDULE" selection button 722. Third display screen interface 720 comprises a plurality of fields 724 to enable the user to schedule usage of one or more selected communication ports $714_1$-$714_M$. For example, one of these fields 724 includes a port number field 725 to identify which communication ports $714_1$-$714_M$ is(are) being selected for usage. Other fields may include date fields 726 to identify the dates of usage and time fields 727 to indicate the start/end time for usage.

Third display screen interface 720 further includes a billing payment field 728 to receive a credit card, debit card, bank account routing number, Internet payment number, etc. Upon completion, the "ACCEPT" button 729 is depressed in which the selected communication ports are activated for during the date and time periods set forth in date and time fields 727 and 728, respectively. Otherwise, the selected communication ports remain deactivated.

Figure 11D:
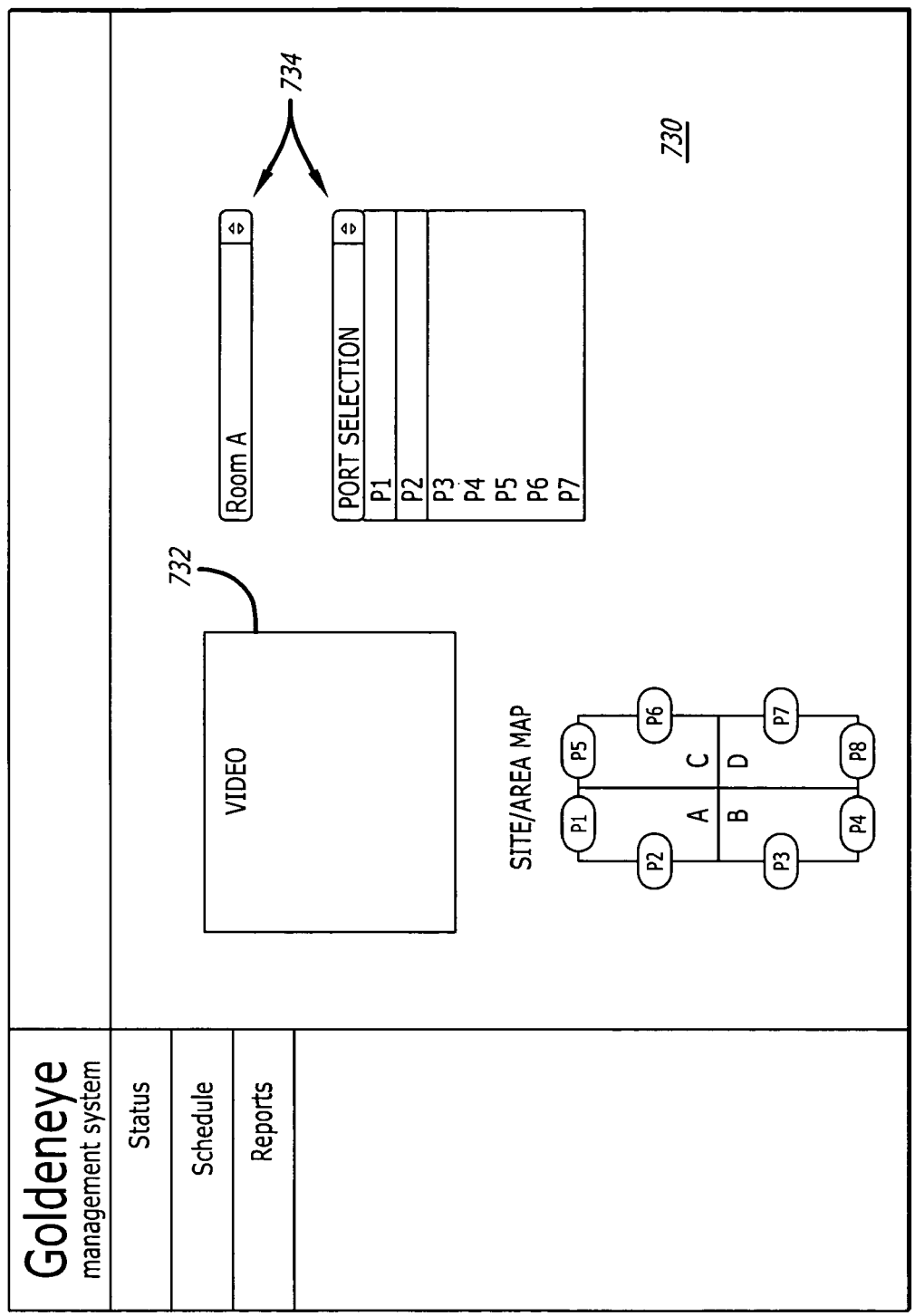

Referring to FIG. 11D, when the selected communication ports are coupled to web-based cameras, a video display screen interface 730 is generated. Display screen interface 730 enables the user to view a video feed 732 from a web-based camera associated with a communication port selected among those communication ports selected for usage. For instance, display screen interface 730 illustrates a video feed received from a web-based camera coupled to a second communication port (P2) positioned within room A. An additional function will be to determine the current status of the activated device via the image recognition of the status light on the device to be controlled.

In the foregoing description, the invention is described with reference to specific exemplary embodiments thereof. It will, however, be evident that various modifications and changes may be made thereto without departing from the broader spirit and scope of the present invention as set forth in the appended claims. Therefore, the specification and drawings are accordingly to be regarded in an illustrative rather than in a restrictive sense.

What is claimed is:

1. A network-based management system, comprising:
a first networked device having a communication port;
a first switch box coupled to the communication port of the first networked device, the first switch box being associated with a fixed network address and enabling both power and data to be provided to the first networked device; and
a user interface unit, being a cellular telephone, adapted for communications with the first switch box, the user interface unit including a touch screen that displays a display screen interface and, based on received input, generates information received by the first switch box to activate and deactivate the first networked device,
wherein the first networked device is an Internet Protocol (IP) based camera that provides content feeds into the communication port being a jack corresponding to the IP based camera, the jack being controlled by the first switch box whereby the first networked device is deactivated by deactivation of the jack and the first networked device is activated by activation of the jack.

2. The network-based management system of claim 1 further comprising a second networked device in communication with the first switch box, the second networked device being activated and deactivated by the first switch box in response to information received by the first switch box via the user interface unit.

3. The network-based management system of claim 1 further comprising a second switch box in communication with a control server, the second switch box being associated with a fixed network address differing from a network address associated with the first switch box.

4. The network-based management system of claim 1, wherein the first switch box is coupled to a communication port of a router assigned a fixed network address.

5. The network-based management system of claim 4, wherein the fixed network address of the router is an Internet Protocol address.

6. The network-based management system of claim 4, wherein the communication port of the router is a parallel port.

7. The network-based management system of claim 1, wherein the communication port of the first networked device is a Universal Serial Bus (USB) port.

8. A network-based management system, comprising:
a networked device having a communication port;
a switch box coupled to the communication port of the networked device, the switch box being associated with a fixed Internet Protocol (IP) address and controlling routing of information, including video data, from the networked device; and
a user interface unit, being a cellular telephone, adapted for communications with the switch box over a public network, the interface unit including a touch screen that is adapted to display a display screen interface that, signals the switch box to activate the networked device to enable the routing of the video data or to deactivate the networked device to disable the routing of the video data,
wherein the networked device is an Internet Protocol (IP) based camera that provides content feeds into the communication port being a jack corresponding to the IP based camera, the jack being controlled by the switch box whereby the networked device is deactivated by deactivation of the jack and the networked device is activated by activation of the jack.

9. The network-based management system of claim 8, wherein the switch box is coupled to a communication port of a router assigned the fixed IP address and in communications with a control server over the public network.

10. The network-based management system of claim 9 further comprising:
a second router in communications with the control server over the public network, the second router having a second fixed IP address differing from the fixed IP address; and
a second switch box in communication with the second router and coupled to a communication port of a second networked device, the second switch box being associated with the second fixed IP address differing from the fixed IP address associated with the switch box.

11. The network-based management system of claim 9, wherein the communication port of the router is a parallel port.

12. The network-based management system of claim 9, wherein the communication port of the router is a Universal Serial Bus (USB) port.

13. A network-based management system, comprising:
a plurality of IP-based cameras each having a communication port;
a switch box coupled to the communication ports of the plurality of IP-based cameras by a corresponding plurality of dedicated links, the switch box being associated with a fixed Internet Protocol (IP) address and controlling continuity of information including video data supplied from the plurality of IP-based cameras; and
a control server in communications with the plurality of IP-based cameras via the switch box, the control server adapted for control by a user interface unit, for allowing selective monitoring, switching and control of the video data from one of the plurality of IP-based cameras and of control information within a local area network or between local area networks globally via an Internet, wherein the user interface unit including a touch screen that is adapted communication with the control server, the user interface unit displaying a display screen interface and either activating or deactivating the plurality of IP-based cameras based on user input within fields of the display screen interface;
wherein the one of the plurality of IP-based cameras is adapted to provide the video data into the communication port being a jack that is controlled by the switch box whereby the one of the plurality of IP-based cameras is deactivated by deactivation of the jack and the one of the plurality of IP-based cameras is activated by activation of the jack.

14. The network-based management system of claim 13, wherein the switch box is coupled to a communication port of a router assigned the fixed IP address and is in communications with the control server over the Internet.

15. The network-based management system of claim 13, wherein the switch box is further adapted to control a supply of power to each of the plurality of IP-based cameras.

* * * * *